United States Patent [19]
Kanai

[11] Patent Number: 5,218,413
[45] Date of Patent: Jun. 8, 1993

[54] OPTICAL DEVICE FOR IMAGE FORMING APPARATUS

[75] Inventor: Nobuo Kanai, Toyohashi, Japan

[73] Assignee: Minolta Camera Kabushiki Kaisha, Osaka, Japan

[21] Appl. No.: 922,851

[22] Filed: Jul. 31, 1992

[30] Foreign Application Priority Data

Jul. 31, 1991 [JP] Japan .................. 3-192112

[51] Int. Cl.$^5$ .............................................. G03G 15/01
[52] U.S. Cl. ..................... 355/326; 355/233; 346/157; 359/819
[58] Field of Search ............... 355/326–328, 355/233; 346/157, 160, 161; 359/819, 811

[56] References Cited

U.S. PATENT DOCUMENTS 4,731,623  3/1988  Oda et al. ............................ 346/160
4,847,644  7/1989  Oda et al. ............................ 346/160

FOREIGN PATENT DOCUMENTS 62-87350   6/1987  Japan .
63-10016   6/1988  Japan .
64-909     1/1989  Japan .
1-137223   5/1989  Japan .

Primary Examiner—R. L. Moses
Attorney, Agent, or Firm—Price, Gess & Ubell

[57] ABSTRACT

An optical device provided in an image forming apparatus and having a laser for emitting a beam, a polygonal mirror for deflecting the beam in a scanning direction, and optical members including an elongated cylindrical lens for directing the deflected beam onto a surface of a photosensitive member. In the optical device, distortion of a scan line of the beam scanned on the surface of the photosensitive member is amended by adjusting the degree of curvature of the cylindrical lens in a plane perpendicular to an optical path.

19 Claims, 5 Drawing Sheets

OPTICAL DEVICE FOR IMAGE FORMING APPARATUS

BACKGROUND OF THE INVENTION

1. Field of the Invention

The present invention relates to an optical device for forming an electrostatic latent image on a photosensitive member by means of a laser beam applied to image forming apparatus such as laser printers and digital copying apparatus.

2. Description of the Related Art

In recent years, many image forming apparatus for laser printers, copying apparatus and the like constructed so as to form an electrostatic latent image by irradiating a photosensitive member with a laser beam.

An optical device of an image forming apparatus of the aforesaid type irradiates the photosensitive member with a scanning laser beam via a polygonal mirror to accomplish the exposure of the photosensitive member along the scan line.

The linearity of the scan line on the surface of the photosensitive member is reduced due to errors and the like of the optical system components such as the lenses, polygonal mirror and the like, which produces distortion or so-called bowing. In this case, the formed image is distorted, thereby reducing image quality.

Specifically when forming multicolor images by forming a plurality of electrostatic latent images corresponding to each color via a plurality of laser beams, the bowing causes color dislocation which results in markedly reduced image quality.

Optical devices of image forming apparatus designed to reduce color dislocation by providing laser beam direction switching members for directing the bowing in the same direction are well known.

Conventional optical devices for image forming apparatus are designed to reduce color dislocation by directing the bowing in the same direction, but since the generation of the bow itself is not prevented, the reduction in image quality caused by the distortion of the image cannot be suppressed. Conventional devices have a further disadvantage inasmuch as color dislocation cannot be reliably prevented when the bow curvatures are not identical.

SUMMARY OF THE INVENTION

A main object of the present invention is to provide an optical device capable of forming precision electrostatic latent images on the surface of a photosensitive member by a laser beam.

Another object of the present invention is to provide an optical device capable of preventing distortion of the scan line of the laser beam irradiating the surface of a photosensitive member.

These and other objects of the invention are achieved by providing an optical device comprising:

beam generating means for generating a beam;

deflecting means for scanning the generated beam;

optical means for guiding the scanned beam to the photosensitive member;

a cylindrical lens incorporated in the optical means; and adjusting means for changing the degree of curvature of the cylindrical lens within a plane perpendicular to the optical path.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENT

An embodiment of the present invention is described with reference to FIGS. 1 through 5 which show an optical device in an image forming apparatus capable of producing two-color images by developing electrostatic latent images formed by two laser beams using toners of two different colors.

Figure 1:
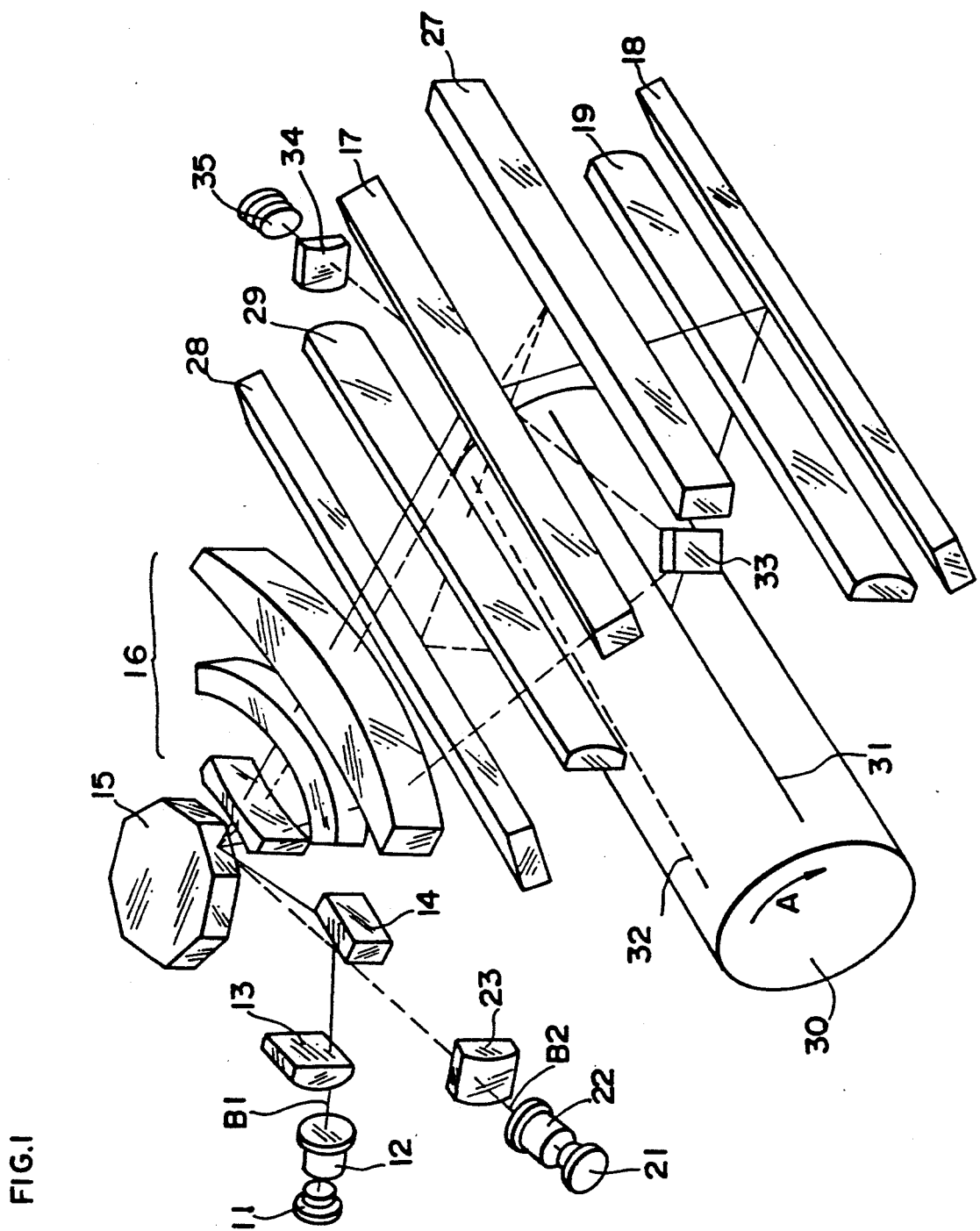
FIG. 1 is a perspective view showing the construction of the optical components in an embodiment of the optical device of the present invention.

In FIG. 1, items 11 and 21 are semiconductor lasers, items 12 and 22 are collimator lenses, items 13 and 23 are cylindrical lenses, item 14 is a composite mirror, item 15 is a polygonal mirror, item 16 is a toric fθ lens, items 17, 18, 27 and 28 are folding mirrors, items 19 and 29 are long cylindrical lenses formed of resin, item 33 is a SOS mirror, item 34 is a SOS cylindrical lens, item 35 is a SOS sensor, and item 30 is a photosensitive drum. Arranged around the periphery of the photosensitive drum 30 but not shown in the drawings are a main charger, two developing devices accommodating two colors of toner, transfer charger, separation charger, cleaning unit and the like. Since the latter components do not pertain to the objects of the present invention, they are omitted from the following description.

The semiconductor lasers 11 and 21 emit the beams B1 and B2, respectively. The composite mirror 14 only reflects the beam B1 emitted from the semiconductor laser 11. The beam B2 emitted from the semiconductor laser 21 passes above the composite mirror 14 and enters the polygonal mirror 15. The polygonal mirror 15 is rotatably driven by a drive means not shown in the drawings, so as to reflect the entering beams B1 and B2 in the scan directions.

The process wherein the beams emitted by the semiconductor lasers irradiate the surface of the photosensitive member is described hereinafter.

The beam B1 emitted from the semiconductor laser 11 passes through the collimator lens 12 so as to form parallel light which enters the cylindrical lens 13. Then, the beam B1 is bent via the composite mirror 14, and condensed in the vicinity of the polygonal mirror 15 in the subscan direction. The condensed beam B1 is deflected by the polygonal mirror 15 at isometric speed and enters the toric fθ lens 16, passes through the folding mirrors 17 and 18 and long cylindrical lens 19 and irradiates the surface of the photosensitive drum 30. As a result, the surface of said photosensitive drum 30 is exposed along the scan line 31.

On the other hand, the beam B2 emitted from the semiconductor laser 21 passes through the collimator lens 22 so as to form parallel light which enters the cylindrical lens 23. Then, the beam B2 passes above the composite mirror 14, and is condensed in the vicinity of the polygonal mirror 15 in the subscan direction. The condensed beam B2 is deflected by the polygonal mirror 15 at isometric speed and enters the toric fθ lens 16, passes through the folding mirror 27, long cylindrical lens 29 and folding mirror 28, and irradiates the surface of the photosensitive drum 30. As a result, the surface of the photosensitive drum 30 is exposed along the scan line 32.

Figure 2:
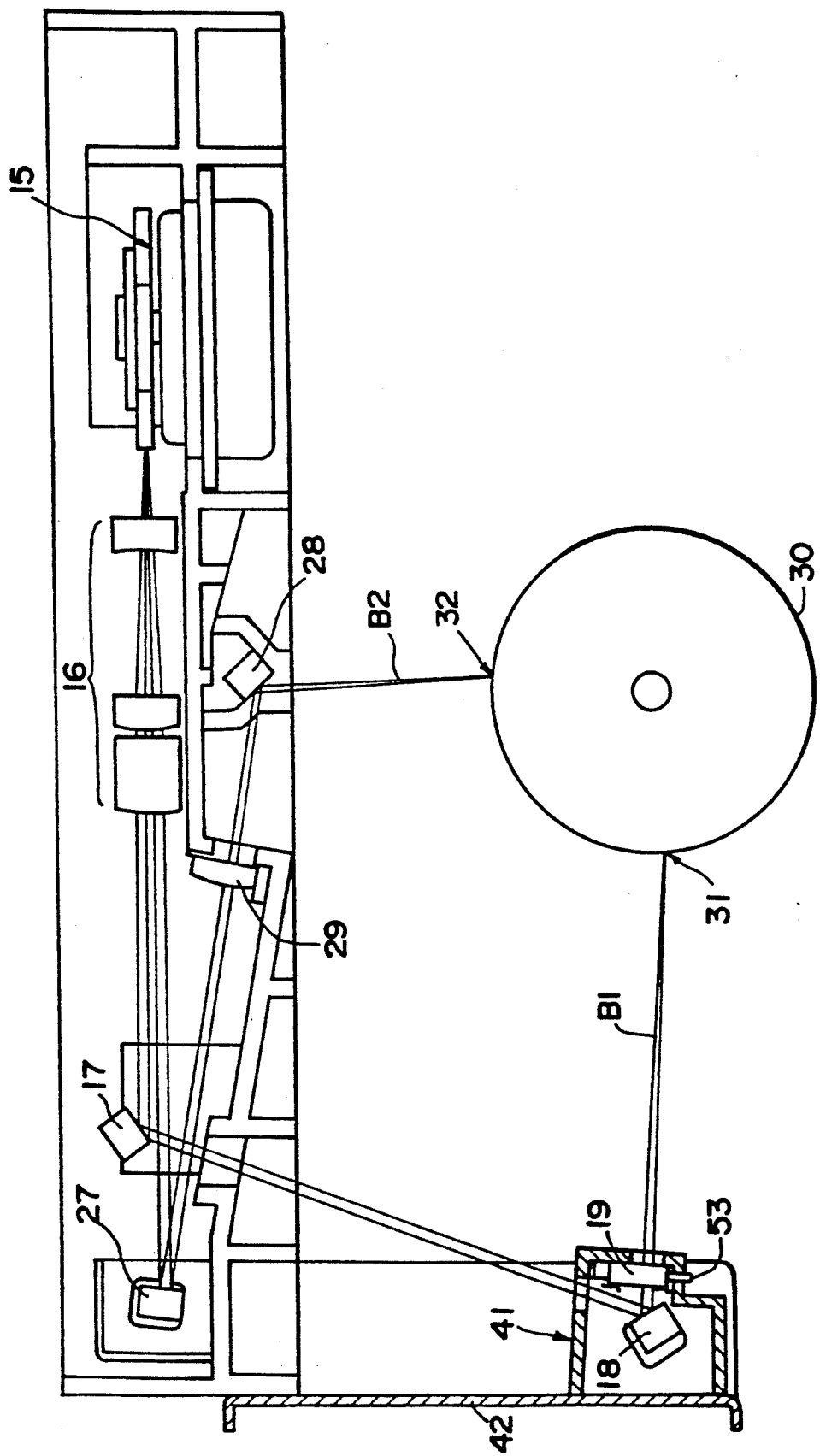
FIG. 2 is an elevation view showing the construction, of the optical device.

The long cylindrical lens 19 is mounted to the frame 42 via a holder 41, as shown in FIG. 2. The lens 19 is positioned in the holder 41 by bringing both ends of an upper surface of the lens 19 in pressing contact with positioning portions 41a of the holder 41. The frame 42 is positioned relative to the photosensitive drum 30 by means of a positioning mechanism which is not shown in the illustration.

Figure 3:
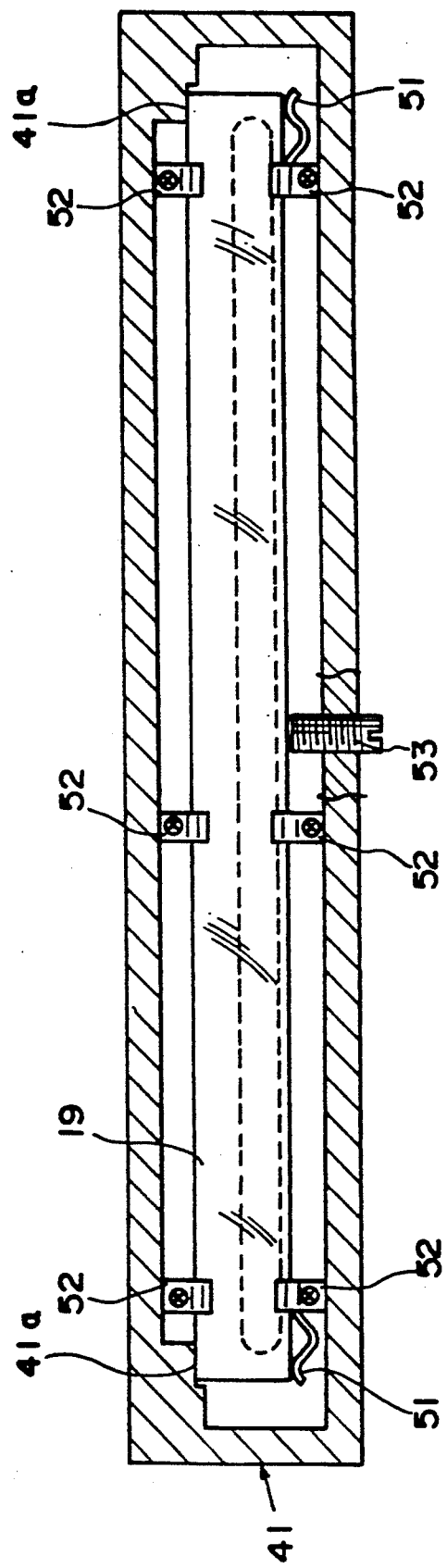
FIG. 3 is a section view showing the construction of the holder in the optical device.

In the holder 41, cylindrical lens 19 is pressed in the interior direction of FIG. 3 via, for example, six individual pressure springs 52 and is rendered stationary by the upward pressure of the spring 51, as shown in FIG. 3. In the center of the bottom surface of the holder 41 is mounted an adjustment screw 53, one end of which contacts with a lower surface of the long cylindrical lens 19. The lens 19 is bent to coincide with the amount of bow generated in the beam B1 by changing the height of the adjustment screw 53 via the rotation of the screw 53, thereby producing a change in the degree of curvature of the scan line 31.

In the previously described construction, each time a toner image is formed, the photosensitive drum 30 is rotated in the arrow A direction of FIG. 1. Then an electrostatic latent image is formed on the surface of the drum 30 on each scan line 32 via the irradiation by the beam B2, and the latent image is developed by a first color toner.

The beam B1 irradiates the surface of the photosensitive drum 30 with a delay of a period only wherein the position irradiated by the beam B2 rotates to the position irradiated by the beam B1 so as to form an electrostatic latent image which overlays the aforesaid toner image. Then, the second latent image is developed by a second color toner.

The two-color toner image formed on the surface of the photosensitive drum 30 is transferred onto a transfer member such as transfer paper or the like via the transfer charger. The transferred toner image is then fused on the transfer paper to produce the print image.

When the relative positional relationships of the aforesaid beams B1 and B2 are not set with a high degree of precision, positional dislocation is produced on the image and the scan lines 31 and 32 bow and ar not straight lines. A usual single beam scanning optical system may produce a bow of about 0.2 mm which is not visually discernable. In the case of multiple beams, however, color dislocation caused by a relative bow of even about 0.2 mm, for example, will produce a reduction in image quality.

Figure 4:
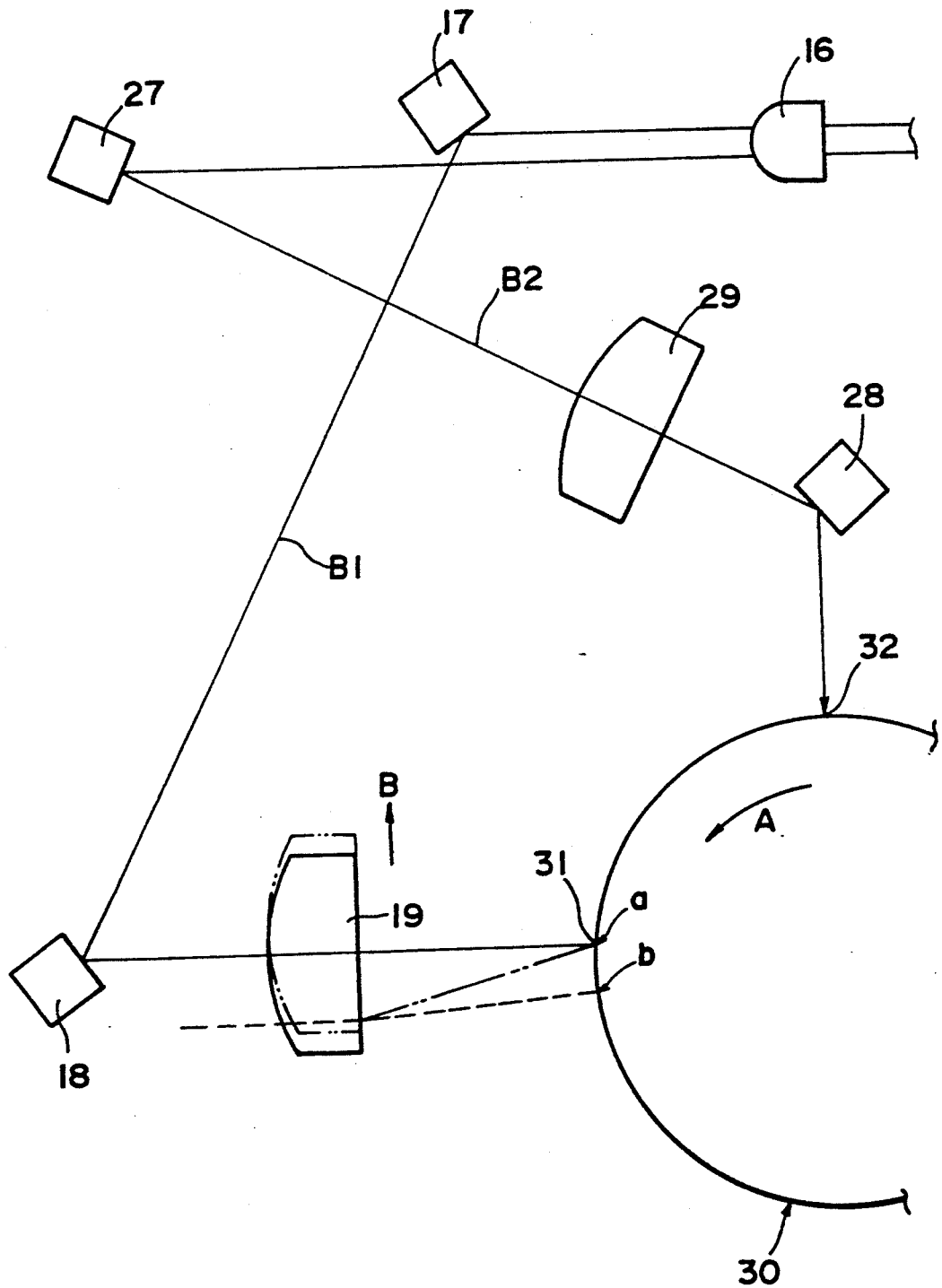
FIG. 4 is an illustration showing the change in the optical path produced by bow adjustment in the optical device.
Figure 5:
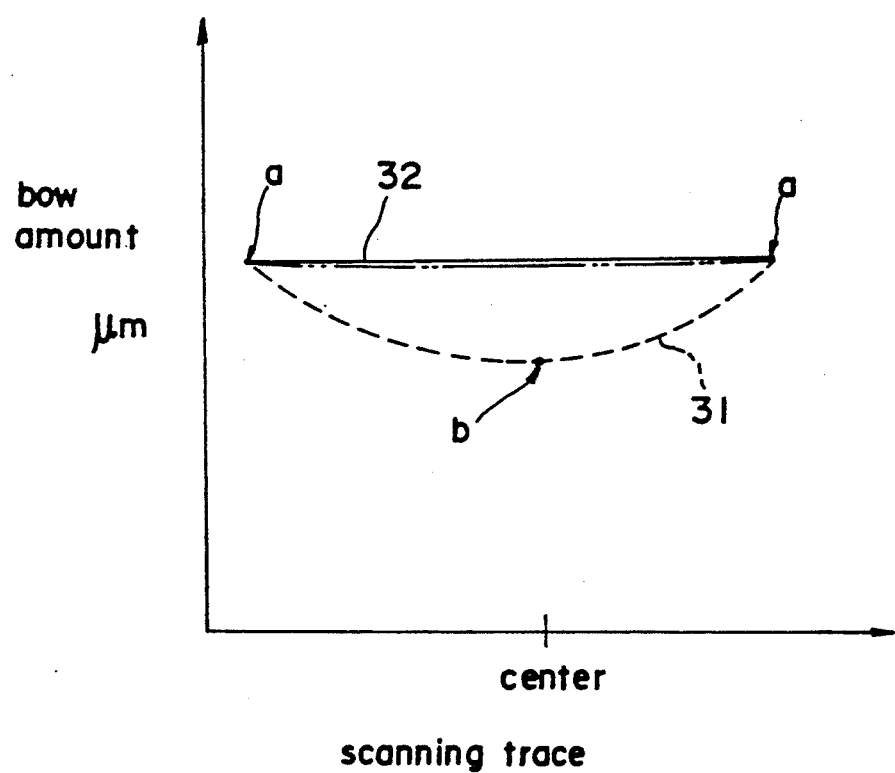
FIG. 5 is an illustration showing an example of the scan line after bow adjustment.

The long cylindrical lens 19 can be bent by rotating the adjustment screw 53 to alter the height of the screw 53, thereby displacing the center portion of the lens 19 in the arrow B direction shown in FIG. 4. Therefore, the optical path of the beam B1 reflected in the vicinity of the center of the long cylindrical lens 19 is changed as indicated by the dashed line in the drawing. The curvature of the scan line 31 is thus reduced such that near the center of the scan line 31 approaches the scan line 32, or the curvature becomes zero. The aforesaid adjustment operation may be accomplished and verified by forming an image such as a test pattern having a plurality of lines.

Although an adjustment screw 53 was provided as an example for bending the long cylindrical lens 19 in the previously described embodiment, it is to be noted that the present invention is not limited to the use of an adjustment screw inasmuch as the aforesaid bending may be accomplished by a piezo-electric element and the like.

Furthermore, a plurality of long cylindrical lenses may be provided on the optical path, wherein any of said long cylindrical lenses may be bent to produce adjustment. For example, when the adjustment sensitivity is increased, a long cylindrical lens near the light source may be adjusted. On the other hand, in order to readily accomplish fine adjustment, a long cylindrical lens far from the light source may be adjusted, or a plurality of long cylindrical lenses may be adjusted. Furthermore, the adjustment operation may be moved to outside the image forming apparatus by, for example, providing the long cylindrical lens positioned above the optical device so as to allow ready adjustment of the lens.

It is to be noted here that a photosensitive belt may be used as a photosensitive member instead of the above photosensitive drum.

Although the long cylindrical lens formed of resin material was used in the aforesaid embodiment, the present invention is not limited to the use of such a lens. That is, resin has an advantage of being readily bendable inasmuch as resins have a small Young's modulus of about twenty times that of glass, and allow the production of large lenses at low cost.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical device provided in an image forming apparatus comprising:
    generating means for generating a beam;
    a deflecting device for deflecting the beam;
    optical means for directing the deflected beam onto a surface of a photosensitive member;
    a cylindrical lens included in said optical means; and
    adjusting means for adjusting the degree of curvature of said cylindrical lens in a plane perpendicular to an optical path.

2. An optical device as claimed in claim 1 wherein said cylindrical lens is elongated and is located at the nearest position with respect to the photosensitive member.

3. An optical device as claimed in claim 1 wherein said cylindrical lens is formed of resin.

4. An optical device as claimed in claim 1 wherein said generating means generates a plurality of beams.

5. An optical device as claimed in claim 1 wherein said cylindrical lens is positioned in a holder by bringing both ends of a surface of the lens in pressing contact with positioning portions of the holder, and said adjusting means includes a rotatable screw mounted in the center of the holder and one end of which contacts with a surface of the cylindrical lens opposed to the surface of the lens in pressing contact with the positioning portions of the holder so as to bend the cylindrical lens by rotating the screw to alter the height thereof.

6. An optical device as claimed in claim 1 wherein said adjusting means includes a piezo-electric element.

7. An optical device as claimed in claim 1 wherein said optical means further includes a collimator lens, a plurality of cylindrical lenses, toric fθ lens and a plurality of mirrors.

8. An optical device as claimed in claim 7 wherein said adjusting means adjusts at least any one of the cylindrical lenses.

9. An optical device as claimed in claim 1, wherein said adjusting means includes a member for physically bending the cylindrical lens.

10. An image forming apparatus comprising:
generating means for generating at least one beam;
a deflecting device for deflecting the beam;
optical means for directing the deflected beam onto a surface of a photosensitive member;
a plurality of cylindrical lenses included in said optical means;
forming means for forming a test image on the surface of the photosensitive member with the beam directed onto the surface of the photosensitive member;
adjusting means for adjusting the degree of curvature of said cylindrical lens in a plane perpendicular to an optical path based on the condition of the test image.

11. An image forming apparatus claimed in claim 10 wherein said cylindrical lens is elongated and is located at the nearest position with respect to the photosensitive member.

12. An image forming apparatus as claimed in claim 10 wherein said cylindrical lens is formed of resin.

13. An image forming apparatus as claimed in claim 10 wherein said cylindrical lens is positioned in a holder by bringing both ends of a surface of the lens in pressing contact with positioning portions of the holder, and said adjusting means includes a rotatable screw mounted in the center of the holder and one end of which contacts with a surface of the cylindrical lens opposite to the surface of the lens in pressing contact with the positioning portions of the holder so as to bend the cylindrical lens by rotating the screw to alter the height thereof.

14. An image forming apparatus as claimed in claim 10 wherein said adjusting means includes a piezo-electric element.

15. An image forming apparatus as claimed in claim 10 wherein said optical means further includes a collimator lens, a plurality of cylindrical lenses, toric fθ lens and a plurality of mirrors.

16. An image forming apparatus as claimed in claim 15 wherein said adjusting means adjusts at least any one of the cylindrical lenses.

17. A method for amending distortion of a scan line of a scanning beam on a surface of the photosensitive member in an image forming apparatus, said method comprising the steps of:
scanning the surface of the photosensitive member with the beam directed on the surface of the photosensitive member via an optical device including a cylindrical lens to form a test image; and
adjusting the degree of curvature of said cylindrical lens in a plane perpendicular to an optical path based on the condition of the test image.

18. In an image forming apparatus for forming a plurality of electrostatic latent images on a photosensitive surface to provide a multicolor composite image by scanning the photosensitive surface with various sources of light to form the images with an optical system directing the scanning light, the improvement comprising:
an elongated cylindrical lens of a plastic resin positioned adjacent the photosensitive surface; and
means for mounting the cylindrical lens to provide a physical bending of a center portion of the cylindrical lends, traverse to the optical axis of scanning light, relative to its respective end portions, whereby a correction of a bow curvature can prevent distortion in the composite image.

19. An image forming apparatus as in claim 18, wherein the means for mounting includes an adjustment member that permits the operator to subjectively bend the cylindrical lens.

* * * * *